United States Patent [19]

Greenhalgh

[11] Patent Number: 4,667,898
[45] Date of Patent: May 26, 1987

[54] AIRCRAFT WITH SINGLE SURFACE MEMBRANOUS AIRFOILS

[75] Inventor: Samuel Greenhalgh, Doylestown, Pa.

[73] Assignee: The United States of America as represented by the Secretary of the Navy, Washington, D.C.

[21] Appl. No.: 761,983

[22] Filed: Aug. 2, 1985

[51] Int. Cl.⁴ .............................................. B64C 3/38
[52] U.S. Cl. ...................................... 244/46; 244/47; 244/48; 244/49; 244/219
[58] Field of Search ................... 244/46, 47, 48, 49, 244/219, 198, 201

[56] References Cited

U.S. PATENT DOCUMENTS

| 1,949,787 | 3/1934 | Dugan | 244/48 |
|---|---|---|---|
| 2,010,549 | 8/1935 | Maring | 244/48 |
| 2,075,787 | 4/1937 | Adams | 244/47 |
| 2,160,089 | 5/1939 | Schairer | 244/48 |
| 2,822,995 | 2/1958 | Bowen | 244/46 |
| 3,147,938 | 9/1964 | Danner | 244/48 |
| 3,185,412 | 5/1965 | Rogallo | 244/49 |
| 3,330,501 | 7/1967 | Barber | 244/47 |
| 3,599,904 | 8/1971 | Condit et al. | 244/49 |
| 4,296,900 | 10/1981 | Krall | 244/219 |

Primary Examiner—Joseph F. Peters, Jr.
Assistant Examiner—Rodney Corl
Attorney, Agent, or Firm—Robert F. Beers; Henry Hansen; James R. Burdett

[57] ABSTRACT

A remotely piloted vehicle is provided with single surface membranous airfoils controllable in flight. The airfoils are selectively deployed from a stowed position on either side within the fuselage by spars attached to the leading edges. Pivotal members attached to the root edges of the airfoils are positioned to regulate twist distribution, angle of attack, root camber ratio and root camber distribution.

8 Claims, 3 Drawing Figures

AIRCRAFT WITH SINGLE SURFACE MEMBRANOUS AIRFOILS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates generally to flexible wing aircraft, and more particularly to single surface membranous lifting surfaces deployable from the fuselage of an aircraft for controlling the flight.

Single surface flexible lifting surfaces or airfoils, commonly used in hang gliders are considered excellent candidates for many other applications due to their low cost and simplicity of construction. For example, they may serve as the primary lifting surfaces on air launched torpedoes and aerial targets. Due to their ability to be folded and stored in the fuselage of a vehicle, such airfoils are also suitable as auxillary lifting surfaces on electronic countermeasure decoys and remotely piloted vehicles (RPV's) for reducing their speed for loitering or recovery on surface vessels.

However, there has been virtually no in-flight adjustment of membranous airfoils for control purposes. In hang gliders, for instance, flight is controlled primarily by a pilot shifting his weight or changing the wing planform. Previous efforts to construct a full scale membranous wing system for unmanned vehicles resulted in complex vibration problems due to membrane flutter. These deficiencies among others, has impeded the use of single surface membraneous airfoils for these other applications.

SUMMARY OF THE INVENTION

Accordingly, it is an object of the present invention to provide single surface membranous airfoils suitable for in-flight control of aircraft. Another object is to provide flexible airfoils which can be folded or rolled up and stowed within the aircraft and deployed in flight. Still another object is to provide single surface membranous airfoils which are aerodynamically stable, inexpensive to manufacture and maintain, and which are particularly suitable for remotely piloted vehicles and the like.

Briefly, these and other objects are accomplished by single surface membranous airfoils deployable from a stowed position in the fuselage of the aircraft to a fully extended position by pivotal spars attached to the leading edges. The airfoil angle of attack, root camber ratio and root camber distribution, and twist distribution are adjustable in flight by various combinations of actuators for integrated roll, pitch and yaw control of the aircraft.

For a better understanding of these and other objects and aspects of the invention, reference is made to the following detailed description taken in conjunction with the accompanying drawings wherein:

DESCRIPTION OF THE PREFERRED EMBODIMENT

Figure 1:
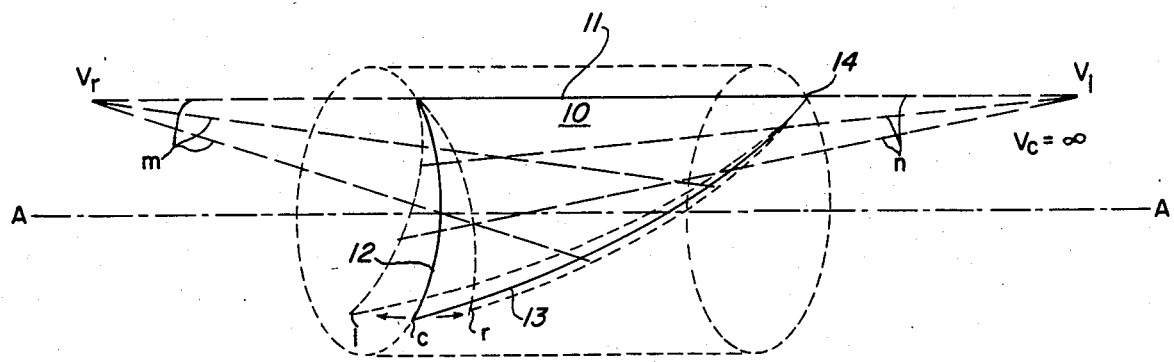
FIG. 1 is a diagramatic representation of a flexible, inextensible, single surface membranous airfoil.

Referring now to the drawings wherein like characters designate like or corresponding parts throughout the several views, there is shown in FIG. 1 a right triangular, inextensible membrane 10 formed into a cylindrical surface about the axis A—A with one side 11 parallel thereto and the other side 12 in a plane normal thereto. This configuration thusly defines a surface with a virtual apex $V_c$ at infinity because the radius of curvature from side 12 to the real apex 14 is constant. That is, the surface is made up of an infinite number of straight lines parallel to side 11 which intersect at infinity. Now if the lower end of side 12 were moved from position c to r without changing the curvature of side 12, membrane 10 will form a conical surface in which all of the straight lines m intersect at a virtual apex $V_r$ because the radius of curvature increases from side 12 to real apex 14. Similarly, moving the lower end of line 12 from position c to l will produce a virtual apex at $V_l$ and the radius of curvature will decrease from line 12 to real apex 14. For a more detailed discussion, see Greenhalgh, S. and Curtiss, Jr., H. C. "Aerodynamic Characteristics of a Membrane Wing", AIAA-84-2168, American Institute of Aeronautics and Astronautics. New York: 1984; and Greenhalgh, S. "A Three Dimensional Inextensible Lifting Membrane Wing—Experimental Results", Report NADC-83130-60, Sept. 1, 1984, NTIS Accession No. ADA 152240, June 21, 1985.

Although FIG. 1 demonstrates the surface changes occurring in a right triangular membrane in a circular plane, similar changes in virtual apex occur in single surface membranous airfoils of other configurations such as the aerodynamic profile described below.

Figure 2:
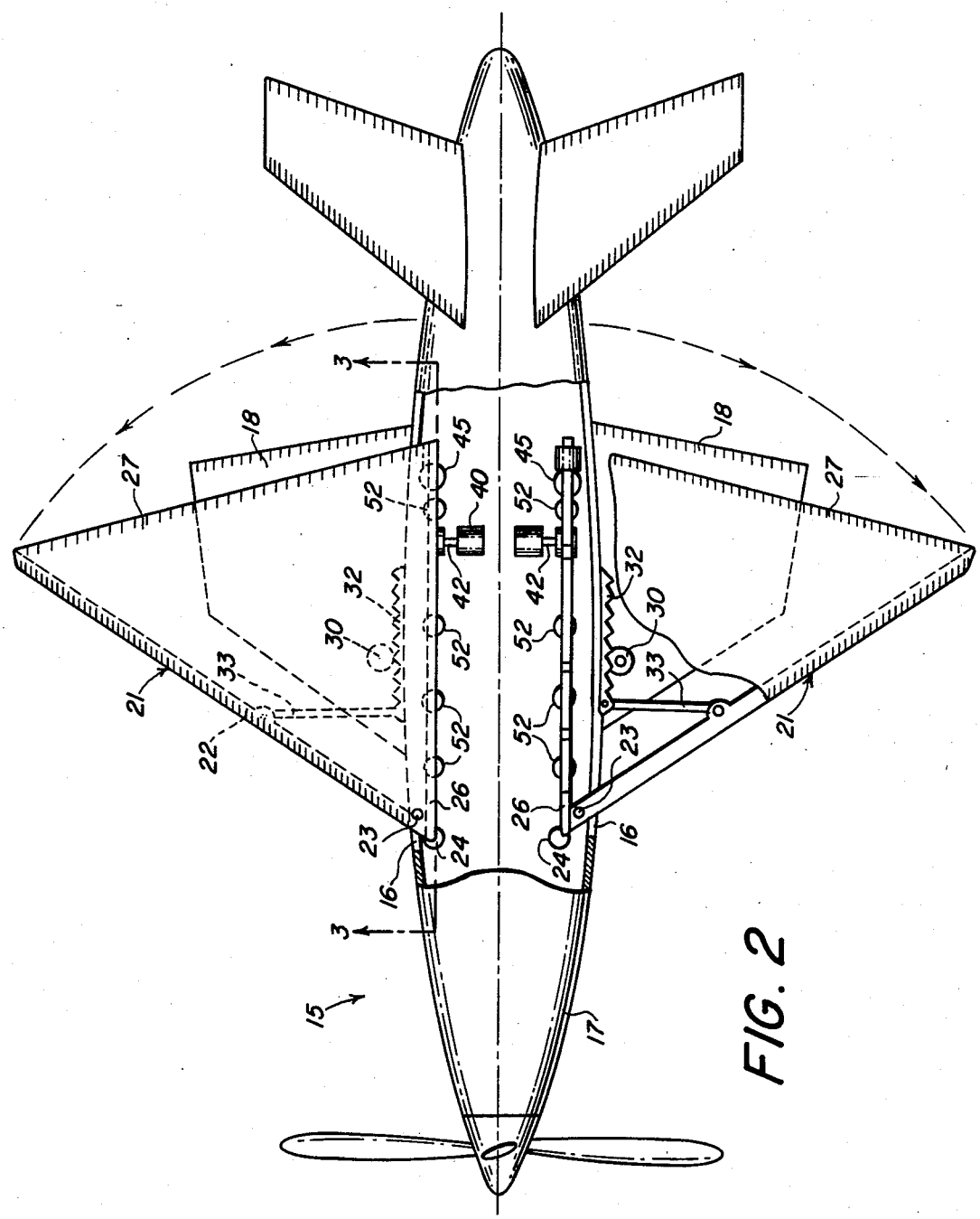
FIG. 2 is a schematic representation of an RPV with single surface membranous airfoils according to the invention in the deployed position.

Referring now to FIG. 2, an RPV 15 is shown with fixed wings 18 for high speed launching, and deployable auxiliary single surface membranous airfoils 21 for low speed loitering or shipboard recovery. Airfoils 21 are shown operationally deployed through slots 16 from stowed positions on either side of fuselage 17. Each airfoil 21 includes a substantially inextensible membrane 27 made of a nonporous fabric, thin metal, plastic, or similar flexible material, contiguously secured along its leading edge to a rigid spar 22, and along its root edge to a rigid member 26. Prior to deployment, membrane 27 is folded or furled into a compact package within fuselage 17. Spar 22 is pivotally connected to fuselage 17 at pins 23 for articulating in the dihedral plane of the airfoil 21. Rotary actuators 30, rack-and-pinion drives 32 mounted on fuselage 17 along slots 16, and linkages 33 pivotally connected between the racks and spars 22, operate in unison, to extend spars 22. That is, as actuators 30 drive the racks aftward, linkages 33 pivot about the racks and spread the spars 22.

Figure 3:
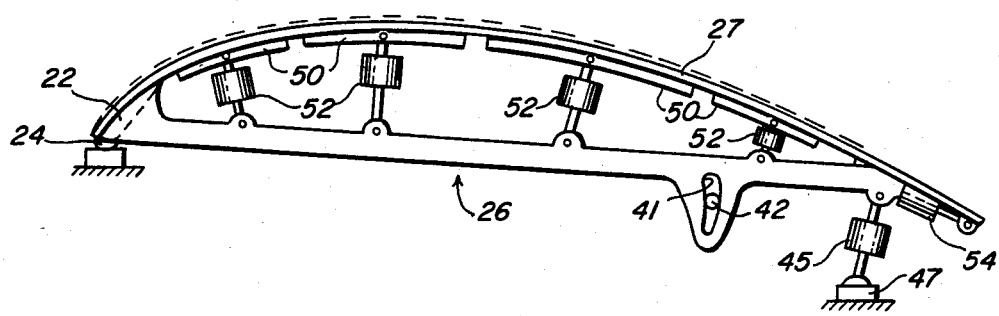
FIG. 3 is a view of an airfoil of FIG. 2 taken at its root along the line 3—3.

Referring to FIG. 3, each member 26 is articulated at its forward end to fuselage structure by pin 24 for pivoting in both the dihedral and vertical planes for altering the virtual apex and angle of attack, respectively. Linear actuator 40 (FIG. 2), connected by rod 42 in arcuate slots 41 formed near the trailing ends of member 26, provides dihedral pivoting for altering the virtual apex. Linear actuators 45 pivotally connected between the trailing end of member 26 and fuselage structure provide the vertical pivoting for altering the angle of attack.

The camber ratio and camber distribution of airfoil 21 are also adjustable at their root members 26. A plurality of contoured braces 50, supporting each membrane 27 in an aerodynamic profile, are adjusted by linear actuators 52 pivotally connected between braces 50 and rib 53. Linear actuator 54 between the trailing end of member 26 and membrane 27 keeps the latter taut and contiguous with braces 50 for all camber ratios and distributions. It is contemplated that the relative positioning of actuators 52 and 54 may be predetermined and programmed by any well-known technique for desired flight conditions such as fuel economy, best maneuverability, shortest take-off and landing, highest lift, lowest drag, best lift/drag ratio, etc.

Correlating the discussion of FIG. 1 with the embodiment in FIG. 2 it should now be apparent that the control forces for roll, yaw and pitch can be regulated at the root members 26 of airfoils 21. Roll (rotation about the longitudinal axis) is regulated by creating a differential lift between the port and starboard airfoils 21. Actuators 45 provide different angles of attack to respective airfoils; actuators 52 provide different root camber ratios and root camber distribution; and actuators 40 and/or actuators 52 provide different wing twist distribution. Yaw (rotation about the vertical axis) is regulated by creating a differential drag between the port and starboard airfoils 21 and is developed in the same manner as roll. Pitch (rotation about the lateral axis) is regulated by collectively changing the port and starboard controls used for roll and yaw. Changing camber, camber distribution, angle of attack, twist distribution, each has an effect on the airfoil pitching movement. Combinations of all the controls both collectively and differentially provide a total integrated flight control for the aircraft.

Some of the many advantages and novel features of the invention should now be apparent. For example, an inexpensive, stowable, membrane winged aircraft is provided having many applications. A single surface airfoil is provided which can be reconfigured in flight to provide aerodynamically stable flight control. It is capable of being used as either a primary or secondary lifting surface deployable from the fuselage of the aircraft. Its simplicity lends itself to low cost and ease of construction.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. In an aircraft having a fuselage and an airfoil attached thereto, the airfoil comprising in combination:
    a spar operatively connected to the fuselage and forming the leading edge of the airfoil;
    a root member pivotally connected at the forward portion thereof to the fuselage for pivoting relative to said spar in the dihedral plane of the airfoil, and having an upper surface formed to impart a root camber to the airfoil;
    a membrane formed to provide the lifting surface of the airfoil and attached along the leading edge to said spar, the root edge being contiguous with the upper surface of said root member and attached to the aft portion of said root member, said membrane having sufficient inextensibility for maintaining the airfoil stiff in the spanwise direction due to the camber imparted by said root member; and
    first positioning means operatively connected to the aft portion of said root member for laterally positioning the root edge of said membrane and thereby regulating the twist distribution of said airfoil.

2. An airfoil according to claim 1 further comprising:
    second positioning means operatively connected to the aftward portion of said root member for regulating the angle of attack of the airfoil.

3. An airfoil according to claim 2 further comprising:
    third positioning means operatively connected to the root portion of said membrane for regulating the root camber and root camber distribution of the airfoil.

4. An airfoil according to claim 3 wherein said third positioning means comprises:
    first actuator means for regulating the aerodynamic root profile of said membrane; and
    second actuator means for regulating the chord length of the airfoil.

5. An airfoil according to claim 4 further comprising:
    said spar being extendable from a stowed position within the fuselage;
    said membrane being compacted within the fuselage when said spar is stowed; and
    actuating means operatively connected to said spar for selectively deploying the airfoil.

6. An airfoil according to claim 1 further comprising:
    second positioning means operatively connected at the root portion of said membrane for regulating the root camber and root camber distribution of the airfoil.

7. An airfoil according to claim 6 wherein said second positioning means comprises:
    first actuator means for regulating the aerodynamic root profile of said membrane; and
    second actuator means for regulating the chord length of the airfoil.

8. An airfoil according to claim 1 further comprising:
    said spar being extendable from a stowed position within the fuselage;
    said membrane being compacted within the fuselage when said spar is stowed; and
    actuating means operatively connected to said spar for selectively deploying the airfoil.

* * * * *